United States Patent Office 3,846,305
Patented Nov. 5, 1974

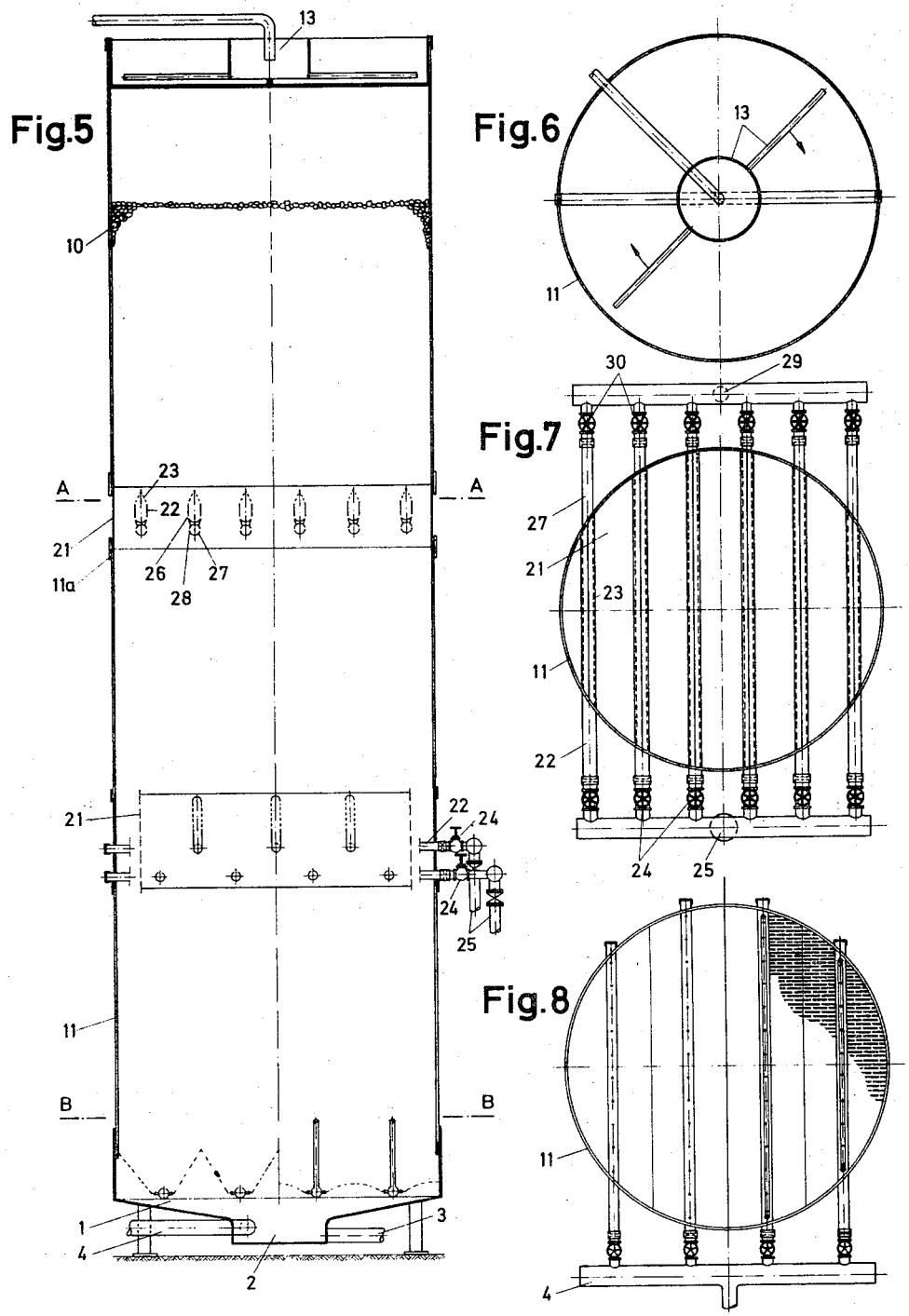

3,846,305
APPARATUS FOR THE FILTRATION AND BIOLOGICAL PURIFICATION OF CONTAMINATED WATER
August Schreiber, Erhard Schreiber, and Berthold Schreiber, all of 45 Bahnhofstr., 3001 Hannover-Vinnhorst, Germany
Filed Mar. 31, 1972, Ser. No. 240,024
Claims priority, application Germany, Apr. 1, 1971, P 21 16 000.9; July 1, 1971, P 21 32 728.6; Oct. 8, 1971, 21 50 345.7
Int. Cl. B01d 35/00
U.S. Cl. 210—150
16 Claims

ABSTRACT OF THE DISCLOSURE

An apparatus for the filtration and biological purification of contaminated water by means of a trickling filter tank wherein a wear-resisting filler material having a specific gravity of not greater than 1 is used. The filler material is filled with flushing water for the purpose of freeing it, and the mixture of filler material, sludge, water and additionally supplied flushing water is displaced by agitation to discharge the greater part of the sludge in the form of a mixture of water and sludge. The flushing water mixed with sludge is thereafter discharged and the trickling filter tank is once again fed with the contaminated water to be purified.

---

The invention relates to a trickling filter for the filtration and biological purification of contaminated water.

The invention relates to the filtration and biological purification of contaminated water by means of a trickling filter. Heretofore, the trickling-through of the mechanically pre-purified sewage uniformly distributed over the artificially aerated, fine-grain charging or filling material, through the filling material was effected as a function of time sufficiently long to achieve the result that the sewage progressively covers the surfaces of the filling material with sludge and microorganisms. Air passage is progressively diminished, due to the gradual clogging of the interstices in the filling material, whereupon the greater portion of the excess sludge is extracted from the filling material, by pumping the latter from the zone of the bottom of the trickling filter to the zone of the top of the latter and, subsequently, once again the trickling of the sewage through the filling or charging material is repeated as a function of time.

Such a process is known from the book "Entwicklung neuer Wege zur biologischen Abwasserreinigung," by A. Schreiber, published by R. Oldenburg, Munich and Berlin, 1940, pp. 53 to 79.

For such process, a fine-grain filling or charging material having a grain size of approximately 2.5 to 10 mm. is used in a fine-grain trickling filter.

With these fine-grain fillings, the loading capacity, i.e. the purification effect of the trickling filter was substantially improved by applying the circulation process described in the said book. The filling material was either manually washed (p. 54) or, in the case of a larger plant (for example p. 63), it was pumped from one location to the other by means of a mammoth pump and, thereby, washed. In this manner, the sludge is separated out of the mixture of filling material and water/sludge and, then, the filling material was again reused, in the purified condition, for sewage purification in the trickling filter.

In this known process (as already stated), extremely good purification results were achieved. However, in the practical carrying into effect of the process, considerable difficulty was encountered. This is due to the fact that as the filler material, relatively heavy and hard materials such as graywacke, pumice grit, slag (pp. 57 and 64 of the said book) were used and this, on carrying the aforesaid circulation process into effect, had the result that there was a high degree of wear with regard to the filler material on all those elements which the filler material contacts, such as pipelines, etc. This wear was not acceptable, so that the process described in the said book was very soon abandoned and is now no longer utilised.

It is at this point that the invention starts, which said invention is based on the problem of how to so design a trickling filter, in predetermined manner, that economical carrying into effect of sewage purification in a trickling filter (while avoiding the known high degree of wear) and with a smaller expenditure of time and energy for the separation of the excess sludge, is made possible.

For this purpose, it is according to the invention proposed to employ a wear-resisting filler material having a specific gravity of somewhat below 1 or of approximately 1, and, for the purpose of freeing the filler material, to fill the latter with flushing water and then, by pressure air or agitation, to displace the mixture of filler material, sludge, water and additionally supplied flushing water, to discharge the greater part of the sludge in the form of a mixture of water and sludge, and then to discharge the flushing water, which is also mixed with sludge, and to once again feed the trickling filter with the water to be purified.

The employment of a fine-grain wear resisting filler material having the specific gravity indicated, in combination with the flushing or de-sludging of the filler material in the trickling filter itself which, in the case of normal or standard sewage purification operation, is not filled with water, is novel and is not made obvious by the above-mentioned book.

The proposal according to the invention enabled persons skilled in the art, for the first time, to carry into effect without difficulty and without producing wear phenomena, and in an economical manner, the process described in the said book, which makes possible a good purification effect in respect to the sewage and a high load capacity in respect to the trickling filter, due to the novel mode of effecting the removal of sludge and due to the employment of relatively light filler material.

For the removal of the excess sludge, according to the apparatus proposed, the trickling filter container is filled with water. The filler material then floats in the water and constitutes, with the latter and with the accumulated sludge, a coarse-grained paste or slurry. It can readily be circulated with the aid of pressurized air and it can readily be agitated with the aid of mechanical means. With this procedure, the sludge is released from the grains of filler material and may be taken off as a diluted sludge via grids having passage apertures which are smaller than the grain size of the filler material. After the sludge has been drawn off, the water is discharged out of the trickling filter container and the trickling filter is once again filled with mechanically purified sewage and the air necessary for biological decomposition is blown-through. The trickling filter is once again ready for operation in only a few minutes time, purifies the sewage in fully biological manner due to the biological sludge still retained in the filler material and retains the activated sludge which has remained behind and is once again redeveloping in the interstices of the filler material until passage of sewage and air has once again been made difficult to such an extent that renewed removal of sludge out of the trickling filter filler material is necessary.

In order that the flushing-out of the sludge may be effected as rapidly as possible while acting on all the filler material zones, it is proposed not to circulate and thereby de-sludge the entire filler material content of the fine-grain trickling filter over its entire height, by adding air and water, but to effect the removal of sludge, after filling up the filler material with water and supplementary addition of flushing water, in various purification zones of the trickling filter in which form types of sludge which differ from each other quantitatively and biologically, separately in each purification zone, with the aid of installed sludge-removal devices, simultaneously or separately, without there being any mixing, in its entirety, of the purification zones carrying various small living organisms.

Thereby, the microorganism species formed in the individual purification zones are for the greater part preserved and are able, since they are not completely flushed-out, to further develop in accordance with their species, without for example microorganisms of the upper purification zone being influenced in disadvantageous manner by microorganisms of a lower purification zone, or *vice versa*, whereby rapid removal of sludge, corresponding to the biological conditions, takes place in the individual zones.

A further proposal consists in that the contaminated water is, due to the selection of the grain size of the filler material, of the instant in time of sludge removal, of aeration and quantity of filler material and the water/space capacity thereof, purified to such an extent that it can be directly introduced into a main draining canal or ditch or re-used for other purposes.

Hitherto, it has not been possible to purify sewage in a trickling filter to such a degree that it could be discharged into a main ditch directly, i.e. without the interpositioning of a secondary settler tank.

According to a further development of the invention, the mechanically purified sewage may be passed over two or more trickling filters connected one behind the other. Similarly, a comparatively extremely high trickling filter having two or more sludge-removal devices designed as sludge-removal grates or grids, may make ordered biological sludge removal possible.

To supplement the sludge removal to be effected zonewise, it is possible to effect the trickling-through of the sewage through the lower zones, for the purpose of retaining the very finest washed-out sludge particles, colloids, phosphates and other harmful substances over filler material and additives having a specific gravity higher than 1 and grain-sizes of approximately 1 mm. diameter. In order not to hinder the passage of water through such fine-grain filter material, due to the air flowing in the opposite direction, aeration of the trickling filler is effected starting from a bottom grid or grate to a point above the fine filter material layer with additives, so that from there it is possible both to aerate the trickling filter and also to cause the air to pass, to a reduced degree with the sewage to be purified, in the same flow through the fine layer of filler material with additives. With this arrangement, the grain sizes of the said fine filler material layer, which may for example be fine grit, and those of the additives are so selected that the flushed-off sludge particles of the trickling filter, i.e. colloids, bacteria, phosphates and other harmful substances, are retained in the fine filler material layer with additives.

If the purification effect of an existing sewage treatment plant is inadequate, the discharge therefrom can, as proposed, be after-purified and fed to a main draining ditch or canal. However, it is also possible to purify sewage which has been mechanically pre-purified to only a very slight degree, in particular industrial sewage, via two trickling filters arranged one behind the other and whereof the first is more frequently flushed than is the second. This applies in particular to industrial sewage because, in that case, the water must be purified for reuse. Furthermore, it is possible to subdivide the fine-grain trickling filter plant into a plurality of juxtaposed settling chambers and to feed the water, via a feed device, on to all the juxtaposed fine-grain trickling filters whereof in each instance one settling chamber is flushed independently of the others.

For the carrying into effect of the invention, there is proposed a trickling filter characterised in that it is watertight and the filler material contained in it consists of wear-resisting material having a specific gravity of somewhat below 1 or of approximately 1, in the form of short cylinders, balls, lenticular elements, short tubes or the like, having a grain size of less than 6 mm., and in that the trickling filter is provided with sewage distributor devices, with devices for scavenging or flushing, circulating and agitating the filler material, with devices for filling the filler material with water, with devices for discharging the excess sludge, with aerating devices and with discharge devices for purified sewage.

One of the essential advantages of the said trickling filter consists, apart from the simple carrying into effect of the proposed process, in the high loading capacity of the trickling filter filler material, due to its larger surface as compared with conventional trickling filter filler material having a grain size of 40 to 80 mm.

It is expedient if, for delimiting the various trickling filter purification zones building up one above the other, there are provided sludge-removal grids or grates by means of which the said zones can, without the filler material of one zone being substantially mixed with the remaining ones, be cleared of sludge one after the other or each one individually.

One of the essential advantages of this embodiment consists in that, with the aid of the proposed sludge-removal grates (constituted for example by pipes or tubes) it becomes possible in a simple manner, after the filling up with water of the trickling filter volume, by adding further water on to the surface of the trickling filter or via the bottom of the trickling filter or through a second sludge-removal grid, to introduce water and air, the sludge released from the filter material due to the infeed of air being discharged via a sludge-removal grid. With this arrangement, the water filling within the filler material is preserved, whereas the additionally supplied flushing water flushes through a predetermined zone, i.e. for example either the zone extending from the bottom of the trickling filter to the lower grid or the zone extending from the surface of the trickling filter up to the uppermost grid. In these throughflow zones, the trickling filter sludge is flushed towards one or more open sludge-removal grids, where it passes through slots into the interior of the sludge-removal grid and is discharged.

In particular when relatively large quantities of water are involved, the trickling filter may be rectangular or its cross-section may also be round.

Further features of the trickling filter may be ascertained from the following description.

The invention relates to fine-grain filler material for use with the proposed trickling filter.

For increasing the resistance to wear of the filler material and the adhesion effect on microorganisms, in such a process it is proposed that plastics or plastics waste, mixed with earthy or non-decaying substances suitable for the adhesion and growth of microorganisms, for example powdered clay, kieselguhr, kaolin, chalk, fine-grain powdered slag or the like, and which has been heated and deformed to strands or strips having spherical pressed-in portions, shall, after cooling, be comminuted by chopping, pounding or grinding, to individual filler material grains taking the form of short cylinders, balls, lenticular elements, short tubes or spherical bodies, the specific weight of which is below 1 or is approximately 1 and the grain size of which is below 6 mm., and which are sewage-resistant and wear-resistant and also have good adhesion faces for microorganisms.

Due to the thus-achieved round surfaces of the filler material grains, not only is a larger surface per unit of volume of the filler material obtained, but furthermore the interstices between the individual grains are enlarged, so that air and water are able to pass through with a lesser degree of resistance and, thereby, more sludge can be deposited in the cavities between the individual bodies. In the case of the proposed filler material, the individual grains of the earthy or non-decaying substances are coated with plastics which in this way forms a firm envelope about the individual grains. In this way, the entire structure of the solidified mass becomes resistant to frictional wear, although the additives, for example kieselguhr, have only a low degree of strength.

Due to the passage of the viscous plastics through the outlet nozzles during deformation to stand or strip or band form, the surfaces of the bodies prepared become extremely smooth. Also the cut faces transversely of the strands are, due to the homogeneous structure of the pure plastics, extremely smooth. Consequently, the contact and adsorption effect and also adhesion of the microorganisms is effected in very disadvantageous manner. If, however, the plastics is, as proposed, deformed together with light, non-decaying substances, then although the generated surfaces of the individual grains nevertheless remain smooth, due to processing in the sequentially connected mill the additive components located under the generated and sectioned surfaces of the small cylinders are partly exposed, so that all in all there is produced a spherical grain having a rough surface on which contaminants and microorganisms are deposited more satisfactorily than they would be on a smooth surface of pure plastics. In this way, the purification effect of the filler material per unit volume is influenced in a very advantageous manner, in particular due to the fact that microorganisms are better able to adhere and are also not completely washed away during sludge flushing.

The specific gravity of the plastics and the specific gravity of the admixed, non-decaying substance are so selected that the final product has a specific gravity lower than 1 per unit of volume or approximately 1 per unit of volume.

The liquid mixture is pressed out of apertures of nozzles having a diameter of approximately 5 mm., the outflowing material being conveyed in the form of strands, by water, meanwhile cooling. Then, the said strands are conveyed for example via a cutting device and are there comminuted and ground to spherical form.

The waste produced by the grinding process may be again added, as plastics waste, to the starting product and once again deformed, so that there is no unnecessary wastage of starting product.

Trickling filters according to the invention are shown by way of example in the drawings, in which.

Figure 3:
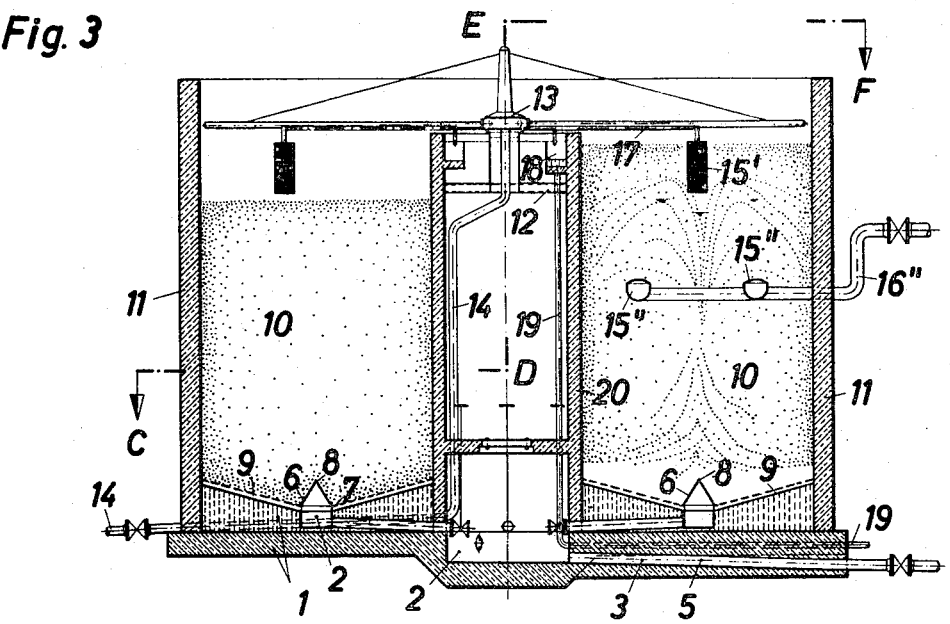
Figure 4:
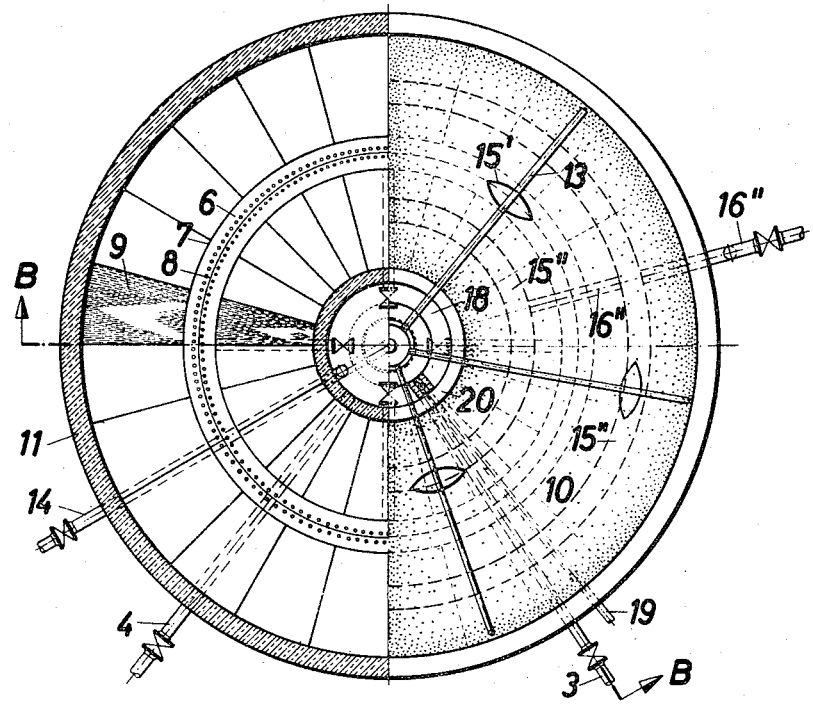
Figure 9:
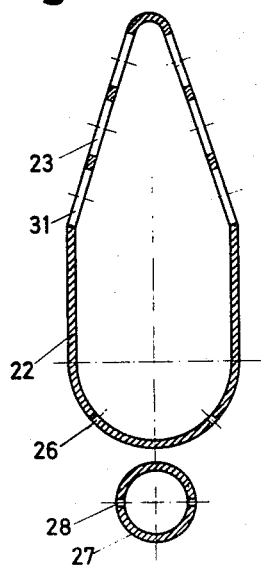
Figure 10:
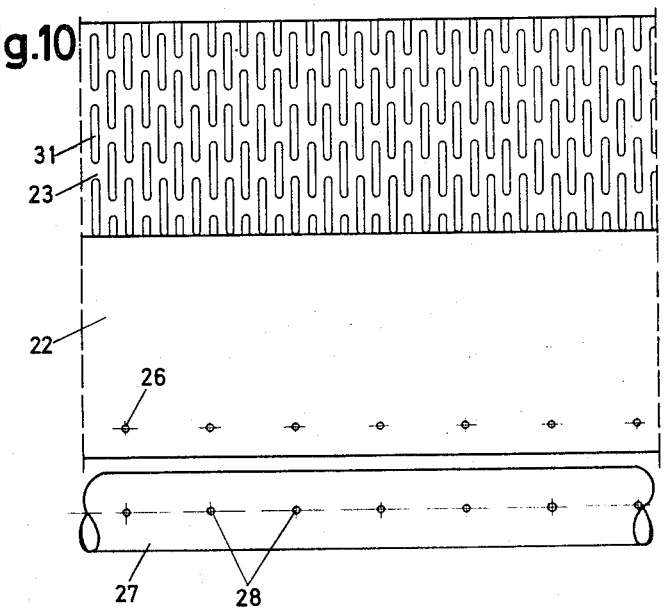
Figure 11:
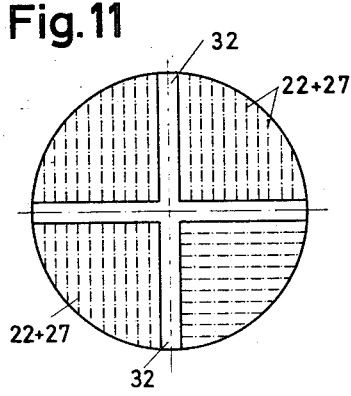
Figure 13:
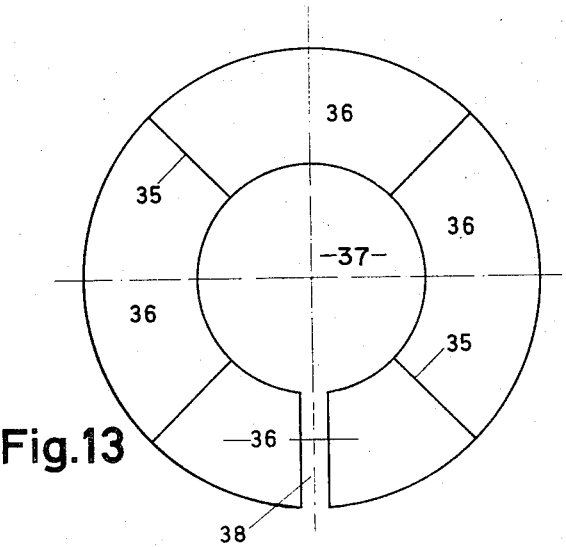
Figure 12:
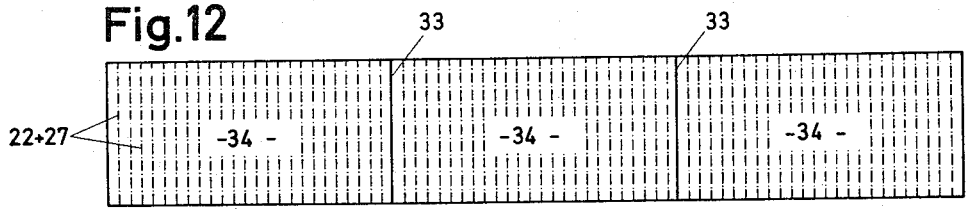

FIG. 3 shows a trickling filter for relatively large quantities of water, as a vertical section along the line B—B of FIG. 4, on the left-hand side in the normal operating condition and on the right-hand side in the sludge-removal condition, FIG. 4 shows the fine trickling filter as a plan view taken along the section line CDEF of FIG. 3, FIG. 5 shows a trickling filter for a small plant, as a vertical section, FIG. 6 shows the trickling filter according to FIG. 5, as a plan view, FIG. 7 shows the trickling filter according to FIG. 5, as a section along the line A—A of FIG. 5, FIG. 8 shows the trickling filter according to FIG. 5 as a section along the line B—B of FIG. 5 and as a plan view, FIG. 9 shows a sludge-removal tube having disposed below it an aerating tube, in section along the line C—C of FIG. 5, FIG. 10 shows a detail of a lateral view of the sludge-removal tube with the aerating tube disposed above it, according to FIG. 9, FIG. 11 shows, diagrammatically, a trickling filter which in cross-section is round and which is intended for relatively large quantities of sewage, the view being a plan view, FIG. 12 shows, in diagrammatic form, a rectangular trickling filter having a turning-sprinkler feed system for relatively large quantities of water, as a plan view, and FIG. 13 shows, diagrammatically, a circular trickling filter for relatively large quantities of water, as a plan view.

Figure 1:
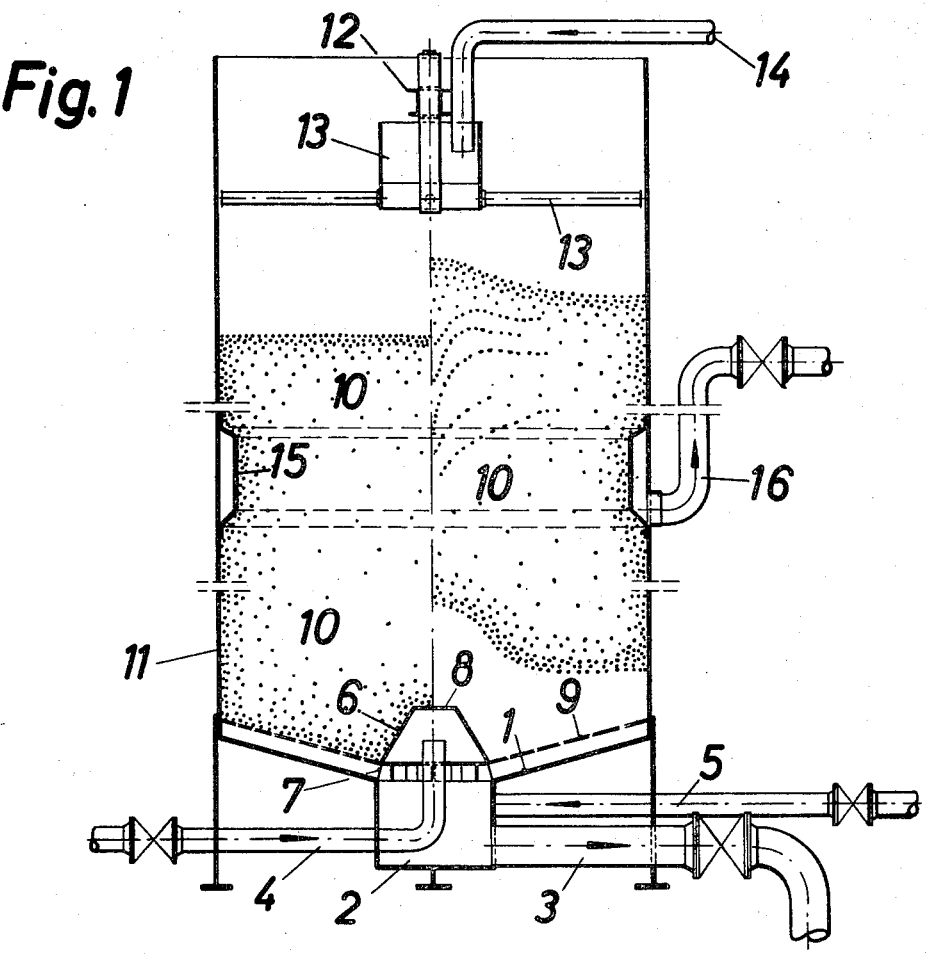
FIG. 1 shows a trickling filter for relatively small quantities of water, as a vertical section taken along the line A—A of FIG. 2, on the left-hand side in the operative condition and on the right-hand side in the sludge-removal condition.
Figure 2:
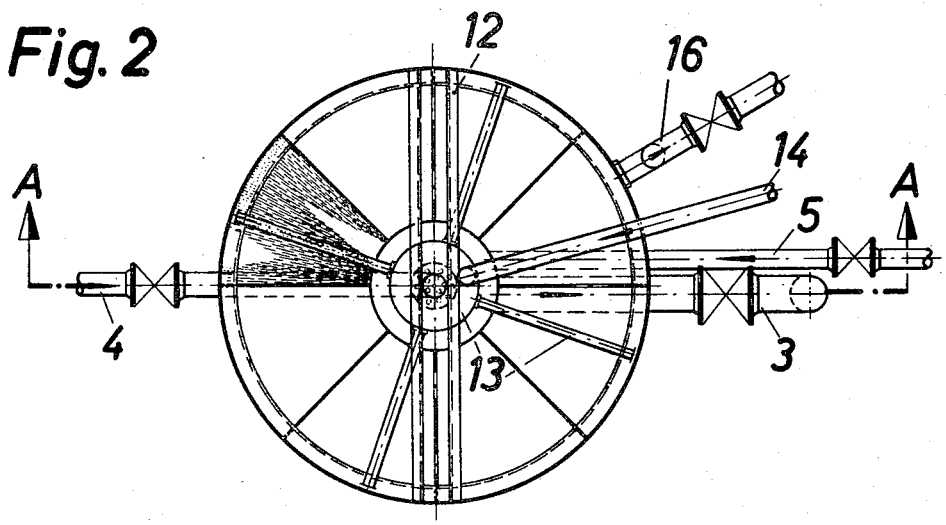
FIG. 2 shows the trickling filter according to FIG. 1, as a plan view.

Referring to FIGS. 1 and 2, the trickling filter has a tank bottom 1 inclined towards the center in the form of a shallow funnel. Arranged in the central zone of the tank bottom 1 is a discharge chamber 2 into which debouch a discharge pipe 3 for the purified sewage, a pressure-air pipe 4 for affording a high water pressure of 3 to 4 m. and a blower pipe 5 for low pressures of between 20 and 40 cm. water pressure. The discharge chamber 2 has a dome-like superstructure 6 above the tank bottom 1, passage apertures 7 and, in the upper zone, air outflow apertures 8. The tank bottom 1 is covered by a bottom grid or grate 9 the passage apertures of which are so dimensioned that the throughflow of water and air are assured but that filler material 10 disposed thereon will not slip through. Connected rigidly and in watertight manner with the tank bottom 1 is the outer surrounding wall 11 of the trickling filter container, having in its upper portion a support web 12 in which a sewage rotary distributor 13 is mounted for rotation. Into the said rotary distributor debouches a feed pipe 14 through which the mechanically pre-purified sewage to be purified flows-in. Provided in the trickling filter container is the trickling filter filler material 10 extending, as the left-hand half of FIG. 1 shows, up to a height spaced somewhat below the rotary distributor 13. The filler material 10 consists of fine-grain plastics material which is preferably spherical, or of short thin tubes, similar to Raschig rings, the specific gravity of the material being lower than that of water, so that it floats on water, and is resistant to sewage and wear. The grain diameter of the fine-grain trickling filter filler material 10 is below 6 mm.

Installed substantially in the central zone of the filler material 10 is a vertical, grid-like sludge discharging face 15 formed, like the bottom grid 9, with passage apertures such that the mixture of sludge and water is able to pass through, but the filler material is not. The sludge discharge face 15 is attached, as a species of a circular ring, on the inner side of the outer surrounding wall 11 and has water removed from it by a sealable sludge-removal pipe 16.

Purification of the sewage is effected approximately as follows: the trickling filter container is filled with filler material 10 up to a level approximately 0.5 m. below the rotary distributor 13. Thereupon, the drain pipe 3 is opened. It is protected externally of the container by a loop designed as a U-pipe against air excess pressure of approximately 5 cm., whereby it is also protected against outflow of blower air. Through the blower pipe 5, air is pressed, via a simple centrifugal blower, into the discharge chamber 2. From there, the air is distributed between the tank bottom 1 and the bottom grid 9 and the air outflow apertures 8 of the dome-like structure 6, over the entire basic face of the filler material 10, whereby it is pressed through the filler material 10.

Then, the inflow aperture 14 for mechanically purified sewage is opened and the inflowing water is uniformly distributed on to the filler material 10 via the rotary distributor 13. In counterflow with the ascending air, the sewage trickles through the filler material 10, passes via the bottom grid 9 into the discharge chamber 2 and via the drain pipe 3 out of the container, whereupon it is discharged into a main draining ditch. On passage of the sewage and when air is present, the individual grains of the filler material 10 are first of all covered with a fine "skin" on which in the course of a few days time microorganisms and also precipitates out of the raw sludge supplied build up. In this way, the sewage is purified to such an extent that it is discharged, clear, free from sludge and freed from dissolved substances which have a tendency to putrify.

The interstices of the filler material 10 become progressively narrower due to the build-up of sludge and microorganisms, so that after a few days time the passage both for air and also for the water coming from above becomes progressively smaller. There then takes place the formation of "puddles" and the sewage no longer passes, uniformly distributed over the entire cross-section, through the trickling filter.

Before this condition occurs, the built-up sludge is, by displacing the filler material, released and drawn off from the filler material grains. This is effected by filling the entire space occupied by filler material 10 during the operative period with water as shown on the left-hand side of FIG. 1. The water is either obtained from the mechanical pre-purification arrangement or, where two or more trickling filters are arranged side by side, from one of the drains. During the filling-up of the trickling filter container, the slide valves of all the pipes leading into the discharge chamber 2 are closed. On filling up the trickling filter container, the filler material 10 then ascends out of its operative position shown on the left-hand side of FIG. 1, by buoyancy effect, into the position shown on the right-hand side of FIG. 1. Due to the buoyant ascending of the filler material 10, there is formed between the bottom grid 9 and the filler material a sewage-filled space, whereas the interstices of the trickling filter filler material are also filled with the infed sewage almost to the full height, until the said infed sewage flows away through the sludge-removal pipe 16 into the inflow pipe leading to the mechanical prepurification system. Then, there is rendered operative a compressor which presses air via the pressure air pipe 4 into the discharge chamber 2 at a pressure higher than would correspond to the resistance of the filled water column. The pressure air then flows through the air outlet apertures 8 of the dome-like structure 6 into the lower water-filled chamber of the trickling filter container, and then into the filler material, whereupon it flows through the latter.

In this way, the water column, inclusive of the filler material 10 will, in the zone above the air outlet apertures 8, due to the air bubbles which are rising up there, have a lower weight than the specific gravity of the filler material in the other zone, so that circulation takes place. The filter material then rises centrally upwardly and, laterally, it travels downwardly once more. During this circulatory movement, the quantity of sewage fed-in via the inflow pipe 14 and the rotary distributor 13 is discharged through the sludge-removal pipe 16. Even after a relatively short time, the greater portion of the sludge which has accumulated in the interstices of the filler material 10 is released and discharged, via the grid-like sludge removal face 15 and the sludge-removal pipe 16 to the inlet to the mechanical pre-purification system.

Then, the discharge pipe 3 is opened once more and the water, which still contains a relatively large amount of sludge, is fed to the infeed to the mechanical prepurification system, until the entire trickling filter container, including the discharge chamber 2, is emptied of sewage. Then, the compressor is once again shut down and air is supplied by the blower, via the blower pipe 5, to the trickling filter filler material, and the cycle recommences. Even after only a short period of time, the discharge from the trickling filter is once again clear and is then separated from the flow to the mechanical purification system and discharged into the main draining canal.

Experience shows that the trickling filter in operation will not have to be re-flushed until several days have passed. Flushing itself requires at most approximately one hour.

FIGS. 3 and 4 show a trickling filter for the purification of relatively large quantities of sewage. In principle, it comprises the same elements as the trickling filter shown in FIGS. 1 and 2. In view of the larger diameter and the necessarily greater degree of control required, the discharge chamber 2 is arranged for access and above it there is arranged a central shaft 20 to which access may be had and in which are arranged the raw sludge infeed pipe 14 and the bearings for the rotary distributor 13. Due to the larger tank bottom 1, the dome-like structure 6 is designed in the form of a ring disposed between the discharge chamber 2 and the outer surrounding wall 11, into which the sewage flows and out of which both the blower air (via the blower pipe 5) and also the pressure air for flushing emanate. Extraction of the sludge-sewage mixture is then effected either via oval grids 15' extending into the flushed filler material 10 or via annular conduits 15'' extending, via the discharge pipe 16'', to the inflow for the mechanical pre-purification system. Instead of the annular conduit 15'', it is also possible to provide a star-shaped conduit. The discharge of sludge on extraction via the grids 15' may be effected by mammoth pumps or the like, via a pipeline 17, a discharge ring 18 and a drain pipe 19.

The mode of operation is exactly like that described with reference to the embodiment according to FIGS. 1 and 2.

The trickling filter shown will be extremely useful in particular in cases when what are concerned are extremely high concentrations and degrees of contamination of the sewage to be purified. Due to the enlargement of the surface of the filler material, with a theoretically identical trickling filter height, a substantially higher purification effect percentage is achieved compared with a comparatively equally high, conventional trickling filter.

However, the trickling filter is especially advantageous also for extremely large quantities of sewage, due to the fact that such fine trickling filter installations can, including the mechanical pre-purification, be constructed in the interior of cities, in whch case the sludge obtained is pumped, via a pressure pipe, to large sludge utilising or sludge processing installations outside the city.

In view of the fact that the trickling filter filler material has a surface which is approximately ten times larger than the trickling filter filler material hitherto used, it is possible to effect a trickling filter loading which is almost ten times greater. Also the circumstance that no secondary settling tank is required and that the purification effect is, save for considerable overloading and infeed of sewage containing toxic contaminants, dependent only on the efficiency of the sewage works supervisor so as in course of time to achieve a highly purified discharge which satisfies the regulations of water boards, is indicative of the advantages of the trickling filter according to the invention relative to other plants of standard design.

Relative to FIGS. 1 to 4, the trickling filter according to FIG. 5 has a tank bottom 1 inclined towards the centre in the form of a shallow funnel. Connected rigidly and water-tight with the tank bottom 1 is the outer surrounding wall 11 of the trickling filter container which, in the present case, consists of transparent material, for example plastics, so as to be able to monitor the clogging with sludge of and the removal of sludge from the filler material 10. For taking up tensile stressing, steel bands 11a are provided. The trickling filter has, furthermore, an upper and a lower sludge-removal grid 21 having water and air infeed and discharge pipes, and also a rotary distributor 13 through which the sewage fed in is uniformly distributed on to the surface. The trickling filter according to FIGS. 5 to 12 is vertically divided into three trickling filter purification zones. Disposed under each of the said purification zones is a sludge-removal grid 21 constituted by sludge-removal tubes 22 and, under the first purification zone is the container bottom 1 through which, on the water filling of the trickling filter being discharged, trickling filter sludge is also discharged. The lower sludge-removal grid 21 in FIG. 5 is a variant of the above-mentioned sludge-removal grid.

An example of an embodiment of the sludge-removal grid 21 is shown in FIGS. 5, 7, 9 and 10. As may be seen from the drawings, it is advantageous to arrange the sludge-removal grids 21 disposed one above the other, with their sludge-removal tubes 22, to be not parallel but offset through 90°, in order that a throughflow of water and air may be assured which is distributed with maximum uniformity.

The sludge-removal pipes 22 serving for sludge discharge are covered over, above, by slotted plates 23 against the penetration of filler material. The sludge-removal pipes 22 extend to the exterior, on both sides, out of the surrounding wall 11 and are connected via sealing devices 24 to a collecting pipe 25. During normal operation, the sealing devices 24 are closed, whereas the sludge-removal means are open, so that the sludge may be discharged, via the collecting pipe 25, to a mechanical pre-purification arrangement. Formed in the bottom of the sludge-removal pipe 22 are apertures 16, through which they are discharged during normal operation.

Disposed below the sludge-removal pipes 22 serving for sludge discharge is in each instance an aerating pipe 27 having lateral air outflow apertures 28 through which air is pressed, via an air feed pipe 29 and a valve 30, into the filler material 10 filled with water. Due to such introduction of air, the filler material floating in the water is set in movement, so that the sludge which is formed during the operational period is for the greater part released from the filler material and also flows for the greater part via slots 31 in the cover plate 23 into the sludge-removal pipe 22, from where (as already described) it is fed to the mechanical pre-purification system.

It has been found that the upper portion of the trickling filter becomes more rapidly clogged with sludge than does the lower portion. In this way, it may be advantageous for the upper portion of the trickling filter to be cleared of sludge more frequently than the portions at a lower level. For this purpose, the entire trickling filter is "banked up" with water and air is introduced via the aerating pipe 27 and flushing water is introduced via the rotary distributor 13, on to the surface. Then as much sludge-water mixture is withdrawn via the individual sludge-removal pipes 22 as water is added, until the upper purification zones have been adequately de-sludged for normal operation.

If the central trickling filter purification zone has become clogged with sludge, then, with the trickling filter "banked up" water may be added through the sludge-removal grid 21 disposed thereunder and the sludge may be discharged in the sludge-removal grid disposed thereabove, air being again fed-in through the aerating pipes 27 and sludge particles released from the filler material and set in motion.

FIG. 11 shows a plan view of a trickling filter of round design. The aerating and the sludge-removal pipes 27 and 22 are shown in dot-dash lines. Provided in the trickling filter, half-way up the trickling filter filler material, is a corridor 32 for an operator.

A rotary distributor arranged over the entire circular-segment areas formed in this manner feeds the entire circular area. The water which trickles-through on to the operator's corridors 32 is collected and returned, as diluted liquid, to the trickling filter infeed.

FIG. 12 shows a rectangular trickling filter, designed as an elongate tank, which is fed by a rotating sprinkler. The said elongate tank is subdivided by partitions 33. This subdivision makes it possible to remove sludge from a fine-grain trickling filter section 34, whilst the remaining sections 34 remain in operation.

If such an elongate tank is guided about a centre-point, there is produced a circular-ring tank according to FIG. 13. Over the latter, a rotary sprinkler or two or more travelling rotary sprinklers will be able to distribute large quantities of water. If the said circular-ring tank is subdivided by a plurality of partitions 35, then it will be possible to remove sludge from an individual trickling filter section 36, without interrupting the operation as a whole. The inner chamber 37 is made accessible by means of an operator's corridor 38 provided part of the way up the filler material. In the inner chamber 37, machines, control apparatus, pipelines and the like may be accommodated. With this arrangement, the inner chamber 37 and also the trickling filter may be covered-over.

Additionally, however, the trickling filter may also be designed, for relatively large quantities of water, in round configuration as a circular cylinder, the sludge removal devices thereof being secured to a bridge. When the container is blocked, the sludge formed is flushed out from time to time by adding water and air.

In this way and in similar ways, trickling filters are able to purify the water with only a low expenditure of operative costs.

What is claimed is:

1. Trickling filter for the filtration and biological purification of contaminated water comprising, at least one water-tight tank containing filler material consisting of wear-resisting material having a specific gravity of not greater than 1, and being in the form of small elements each having a grain size of less than 6 mm., said tank being provided with storage distributor devices near the top thereof for distributing contaminated water over said filler material, and said tank having a bottom wall sloping toward a discharge chamber provided therebelow into which the water purified after having trickled through said filler material is diverted, aeration means near the bottom of said tank for aerating said filler material upwardly therethrough while the contaminated water trickles through said filler material, means near the bottom of said tank for filling said tank with rinsing water upwardly therethrough for cleansing said filler material of any sludge or microorganisms covering said elements, the incoming rinsing water effectively buoying up said filler material in said tank, means on said tank for circulating said filler material with the rinsing water and contaminated water within said tank, means on the side wall of said tank for the removal of the sludge and microorganisms covering said elements, grid means located above said bottom wall for preventing said filler material from discharging into said chamber, and further grid means in said tank adjacent said removal means for preventing said filler material from being removed therethrough.

2. The trickling filter according to claim 1 wherein said bottom wall is inclined downwardly toward its center, said circulating means being defined by a pressurized air line, a dome-like discharge chamber being connected with said bottom wall and located at said center, said air line extending into said discharge chamber, and openings provided in said chamber through which the pressurized air flows.

3. The trickling filter according to claim 1 wherein said small elements each comprise a mixture of plastic material and a non-decomposable substance suitable for the adhesion and growth of microorganisms.

4. The trickling filter according to claim 3 wherein said non-decomposable substance is selected from the group consisting of powdered clay, kieselguhr, kaolin, chalk and fine-grain powdered slag.

5. Trickling filter according to claim 1 wherein said tank is elongated and upright, and further comprising spaced sludge-removing grids mounted within said tank along its height for defining trickling filter purification zones located one above the other whereby said zones can, without the filler material of one zone being substantially mixed with the remaining zones, be de-sludged one after the other or each one individually.

6. Trickling filter according to claim 5 wherein at least two of said tanks are arranged one behind the other.

7. Trickling filter according to claim 5 wherein said sludge-removal grids extend radially and parallel to each other through the filler material.

8. Trickling filter according to claim 7, characterized in that the sludge-removal grids are constituted by sludge-removal tubes each of which is capable of being put into operation individually or jointly and each of which has, individually, a lower aerating pipe, and is covered above with a slotted plate.

9. Trickling filter according to claim 5 wherein there is disposed within the individual trickling filter purification zones filler material of varying grain size, varying specific gravity and varying colour.

10. Trickling filter according to claim 1 wherein said tank is subdivided into a plurality of juxtaposed trickling filter sections by means of vertical partitions, and wherein said water filling means includes a feed device for introducing the water on to all the juxtaposed sections each of which is adapted to have sludge removed from it independently of the others, during operation.

11. Trickling filter according to claim 10, wherein, especially for a large supply of water, there are arranged in the lower zone of the trickling filter operator's corridors on which the water which has trickled through accumulates and is returned as diluted liquid to the trickling filter infeed.

12. Trickling filter according to claim 1 wherein said tank is in the form of a circular-ring cylinder in which there is provided an operator's corridor extending over a portion of the height of said tank, a plurality of radially subdivided trickling filter circular sections and a large covered inner chamber for machines, connecting pipelines, control apparatus or the like, and wherein each trickling filter circular section is adapted to have sludge removed from it independently of the others, during operation of the remaining circular sections, and wherein for the feeding of all the circular sections there is provided a rotary distributor.

13. Trickling filter according to claim 1 wherein said tank is rectangular in transverse section and is provided with vertical partitions, and with a travelling rotary sprinkler for water irrigation.

14. Trickling filter according to claim 1, wherein the lower position of said tank is filled with filler material and additives having together a specific gravity higher than 1, the grain sizes of which being about 1 mm.

15. Trickling filter according to claim 1 wherein the wall of said tank is of a transparent plastics material, and steel bands being provided encircling said tank for taking up any tensile stressing thereof.

16. Trickling filter according to claim 1 wherein said filler material has added to it, in order to improve oxygen transmission, additives such as catalysts and additives for binding phosphates, ammonia or the like.

References Cited
UNITED STATES PATENTS

| | | | |
|---|---|---|---|
| 3,709,364 | 1/1973 | Savage | 210—275 X |
| 3,695,433 | 10/1972 | Hirs et al. | 210—275 X |
| 2,992,986 | 7/1961 | Ingram | 210—150 X |
| 3,543,937 | 12/1970 | Choun | 210—150 |
| 3,424,674 | 1/1969 | Webber | 210—20 |

JOHN ADEE, Jr., Primary Examiner

R. H. SPITZER, Assistant Examiner

U.S. Cl. X.R.

210—274, 279